Patented Jan. 3, 1933

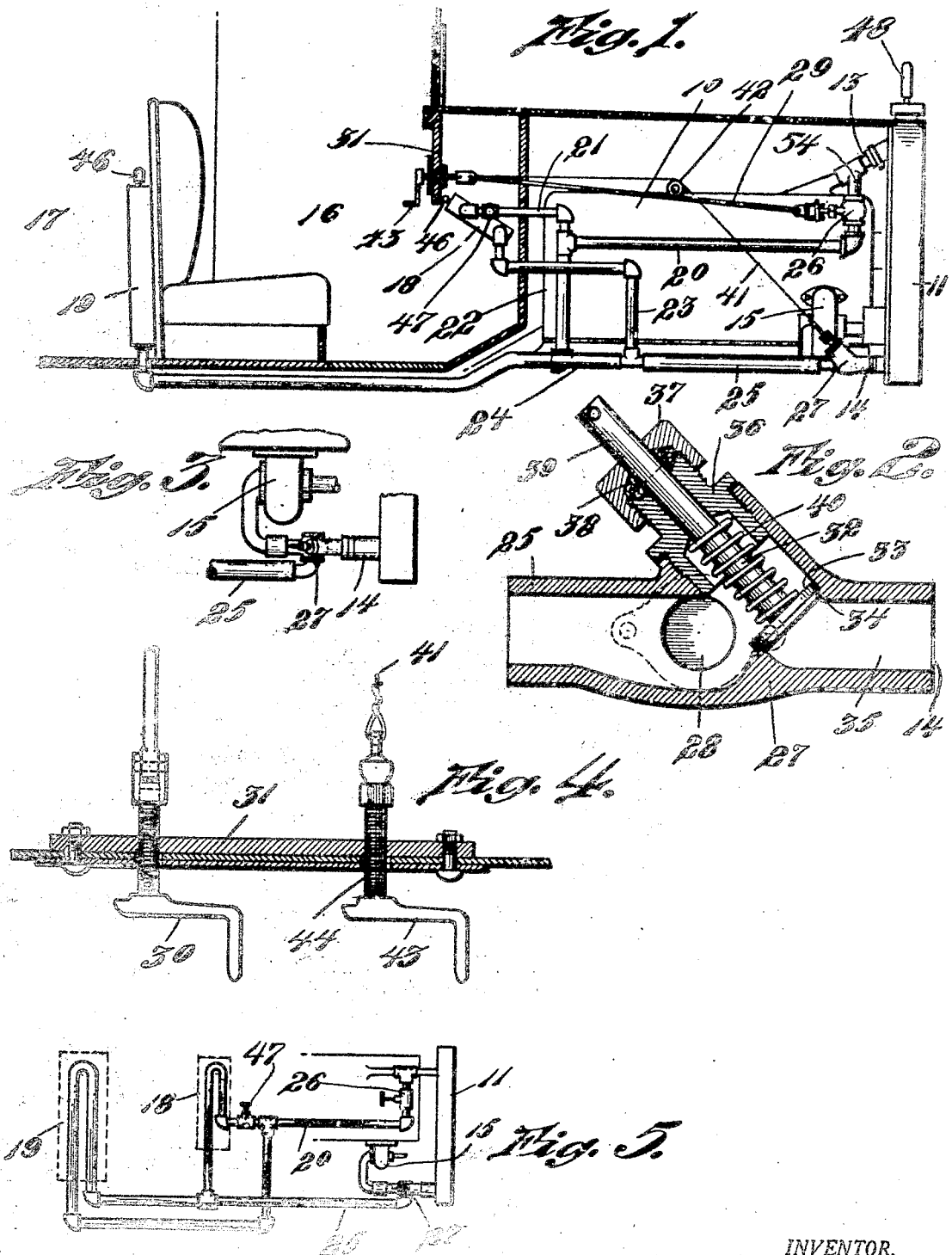

1,893,059

UNITED STATES PATENT OFFICE

PETER MAYHEW, OF BARRINGTON, RHODE ISLAND

MOTOR VEHICLE HEATER

Application filed May 26, 1931. Serial No. 540,078.

This invention relates to a heating system for a motor vehicle and has for its object to provide a construction by which an automobile preferably of the enclosed type may be heated to afford comfort to its occupants in riding.

Another object of this invention is to utilize all of the heat generated in the internal combustion engine for heating the area desired to be heated.

Another object of the invention is to control the circulation of the heating medium so that it may be directed entirely to the radiating system for heating the area desired to be heated or may be partially so directed and partially cooled by the cooling radiator for the internal combustion engine.

Another object of the invention is a provision of means by which not only the area to be heated may be quickly heated but also the engine may be more quickly heated for efficient work.

A further object of the invention is to provide such a construction that it may be attached to any of the commonly used water cooled automotive engines with the utilization of the circulating pump for circulating the heating medium through the attached radiator system and without necessitating the use of additional pumps or the like apparatus.

A still further object of the invention is the provision of a construction which may be controlled from the dash board of the automobile.

With these and other advantageous features in view, the invention consists of a novel arrangement of parts more fully disclosed in the detailed description following, in conjunction with the accompanying drawing, and more particularly set forth in the appended claims.

Fig. 1 is a fragmental view largely diagrammatic of the heating system as applied to an automobile.

Fig. 2 is a sectional view of the valve for controlling one of the conduits.

Fig. 3 is a fragmental plan view of the arrangement of the conduits adjacent the water pump and valve.

Fig. 4 is a fragmental view through the dash board showing on a scale larger than that of Fig. 1, the controls for the conduits.

Fig. 5 is a diagrammatic view of the heating system with the connections to the engine in plan view and showing the arrangement of the conduits for utilizing as the heating medium the water for cooling the engine.

In cold climates it is desirable to provide some means of heating a motor vehicle for the comfort of the driver thereof or passengers carried therein. Many motor vehicles are driven by an internal combustion engine having a water cooling system and it is the object of this invention to utilize the heat generated in the internal combustion engine, which is absorbed by the water, for heating the area of the automobile desired to be so heated. It is also desirable to acquire this heat in the area desired to be heated quickly, and to this end I have arranged a heat radiating system within the tonneau of an automobile and have so connected the same to the water cooling system of the motor vehicle that the heated water may be transferred wholly to my heat radiating system entirely independent of the cooling radiator of the automobile, by which the heat, from the explosions of the engine, which is picked up by the water circulating medium, is quickly accumulated to cause the tonneau of the automobile to be heated and at the same time the engine heated for more efficient operation. I have accomplished this result by providing a valve between the pump and radiator of the automobile and connected the heat radiating system adjacent this valve so that the entire circulation through the cooling radiator may be cut off or partially cut off as desired for complete control of the heating system. By such connection I also utilize the pump which circulates the liquid medium in the engine for circulating the liquid medium through my attached radiating system thus simplifying the mechanism required and acquiring the desired results; and the following is a detailed description of the present embodiment of this invention illustrating the preferred means by which these advantageous results may be accomplished.

With reference to the drawing, Fig. 1 is a largely diagrammatic view of a portion of an automobile having an engine 10 provided with the usual cooling radiator 11 which is connected to the water jacket portion of the engine through connections 13 and 14. Interposed in the connection 14 between the radiator 11 and connection 14 is a pump designated generally 15 for circulating the engine cooling liquid medium, usually water, through the water jackets of the engine and through the radiator 11.

In order to heat the compartment for the driver's seat designated 16 and the rear tonneau 17 which are the areas desired to be heated I have located radiators 18 and 19 in these areas and have provided a common conduit 20 joining the conduit between the engine and cooling radiator and branching as at 21 and 22 for communication with the two different radiators 18 and 19 through which conduits the heated liquid medium is supplied while this medium is returned by branches 23 and 24 uniting in a common conduit 25 connected to the water circulating system of the engine adjacent the pump. The conduit 20 is joined to the conduit 13 as at 54 in which there is provided a valve 26 of the gate valve type while the common conduit 25 is joined to conduit 14 through a valve 27 having outlet 28 leading to the pump 15.

The valve 26 is controlled through rod 29 and handle 30 mounted upon the dash 31. The valve 27 has a plunger 32 with a head 33 to seat as at 34 and close its outlet 35 to the conduit 14, the head portion 33 being forced against the seat 34 by coiled spring 40 acting between the head and the gland 36 threadingly engaged by a member 37 for binding the packing 38 closely about the stem portion 39 thereof to prevent leakage. This valve is also controlled from the dash board through a flexible wire 41 placed over a sheave 42 and operated by handle 43 which may move inwardly and outwardly through the dash 31 by means of its threaded portion 44 whereby the valve may be opened or closed or partially opened from the dash as desired. The conduit pipes 20 and 25 may be covered with asbestos or other suitable material while the radiator may be provided with suitable air valves 46 for efficiency in operation.

It will be understood that to operate this construction the valve 26 is first completely opened and the valve 27 is permitted to seat thus completely cutting off the cooling radiator 11. The heated water will then enter the system through the conduit 20 pass through radiators 18 and 19 or merely radiator 19 if valve 47 is closed, returning by conduit 25 to pass through the outlet 28 of the valve 27 to the pump where it is pumped through the engine to complete the cycle of travel.

In this manner the area desired to be heated obtains the heat from the water of the engine system and as the heat is not disseminated as quickly as through cooling radiator 11 the heat builds up or is quickly accumulated to permit the engine to become more quickly heated and like wise the interior of the motor vehicle.

When the desired temperature has been reached the head 33 of the valve 27 may be opened gradually to permit cooling of the system by the water in the radiator 11 until the desired temperature is reached.

The connection to the engine is such as not to disturb the indication of boiling by motor meter 48 which is always in view of the operator of the vehicle.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In combination with a vehicle body, a motor having a cooling water jacket thereabout, a radiator, upper and lower conduits connecting said water jacket to said radiator for circulation therethrough, a water pump in the lower conduit, and a control valve in said lower conduit, a radiator in the vehicle body, an auxiliary conduit connecting said body radiator to said upper conduit, a control valve in said auxiliary conduit spaced from said upper conduit, and an auxiliary conduit connecting said body radiator to said lower conduit between said control valve therein and said pump, whereby circulation through the body radiator is controlled and the upper conduit is left open at all times to permit the escape of vapor from the motor jacket.

2. In combination with a vehicle body, a motor having a cooling water jacket thereabout, a radiator, upper and lower conduits connecting said water jacket to said radiator for circulation therethrough, a water pump in the lower conduit, and a control valve in said lower conduit, a radiator in the vehicle body, an auxiliary conduit connecting said body radiator to said upper conduit, a control valve in said auxiliary conduit spaced from said upper conduit, and an auxiliary conduit connecting said body radiator to said lower conduit between said control valve therein and said pump whereby circulation through the body radiator is controlled and the upper conduit is left open at all times to permit the escape of vapor from the motor jacket, and manually operated means for controlling said valves from the body of the vehicle.

3. In combination with a vehicle body, a motor having a cooling water jacket thereabout, a radiator, upper and lower conduits connecting said water jacket to said radiator for circulation therethrough, a water pump in the lower conduit, and a control valve in said lower conduit a radiator in the vehicle body, an auxiliary conduit connecting said body radiator to said upper conduit, a control valve in said auxiliary conduit spaced from but adjacent to the upper conduit, and an auxiliary conduit connecting said body radiator to said lower conduit between said control valve therein and said pump whereby circulation through the body radiator is controlled and the upper conduit is left open at all times to permit the escape of vapor from the water jacket, said auxiliary conduits being so arranged that the water passing through any part thereof must pass through the body radiator in being returned to the water jacket.

In testimony whereof I affix my signature.

PETER MAYHEW.